(12) United States Patent
Pedersen et al.

(10) Patent No.: US 11,224,820 B2
(45) Date of Patent: Jan. 18, 2022

(54) VEHICLE COMPRISING AN ELECTRIC MOTOR AND A METHOD OF STARTING AN ELECTRIC MOTOR FOR PROPULSION OF A VEHICLE

(71) Applicant: LEGO A/S, Billund (DK)

(72) Inventors: Kasper Mygind Pedersen, Hjørring (DK); Henning Mikkelsen, Struer (DK); Henning Sand Kirk, Løsning (DK); Orkan Kilic, Hasselager (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 16/344,440

(22) PCT Filed: Oct. 30, 2017

(86) PCT No.: PCT/EP2017/077726
§ 371 (c)(1),
(2) Date: Apr. 24, 2019

(87) PCT Pub. No.: WO2018/078151
PCT Pub. Date: May 3, 2018

(65) Prior Publication Data
US 2019/0321740 A1    Oct. 24, 2019

(30) Foreign Application Priority Data

Oct. 31, 2016 (DK) .......................... PA 2016 70854

(51) Int. Cl.
*A63H 29/22* (2006.01)
*A63H 29/24* (2006.01)
(Continued)

(52) U.S. Cl.
CPC ............ *A63H 29/22* (2013.01); *A63H 29/24* (2013.01); *A63H 17/262* (2013.01); *A63H 17/32* (2013.01);
(Continued)

(58) Field of Classification Search
CPC ...... A63H 29/22; A63H 29/24; A63H 17/262; A63H 17/264; A63H 17/32; A63H 17/42; B60L 2240/12; B60L 2240/429
(Continued)

(56) References Cited

U.S. PATENT DOCUMENTS 2,632,284 A * 3/1953 Louis ..................... A63H 19/00
105/49
4,396,876 A * 8/1983 Tojiki .................. H02P 29/0022
318/255
(Continued)

FOREIGN PATENT DOCUMENTS

CN       203029986 U     7/2013
DE   10 2013 224 885 A1  6/2015
(Continued)

OTHER PUBLICATIONS

First Office Action issued in corresponding CN patent application No. 201780067834.6, dated Jun. 22, 2020. Original and English language translation: 18 pages.
(Continued)

*Primary Examiner* — Joseph B Baldori
(74) *Attorney, Agent, or Firm* — Day Pitney LLP; Valeriya Svystun

(57) ABSTRACT

A vehicle (10) comprising a body (20), a first wheel axle (31) and a second wheel axle (41), whereon one or more wheels (30, 40) is/are mounted, an electric motor (51) and a control unit (52); and wherein the electric motor is connected to the second wheel axle (41); and wherein the electric motor is configured for driving the one or more wheels (40) that is/are mounted on the second wheel axle (41), wherein said vehicle (10) comprises a movement detection unit configured for detecting a movement in the form of a rotation of the vehicle's wheels (30, 40) and/or wheel axles (31, 41); and wherein the control unit (52) is configured for receiving a
(Continued)

signal from the movement detection unit when it detects a movement of the vehicle; and wherein the control unit (52) is configured for transmitting a signal to the electric motor (51) when the movement detection unit detects a movement in the form of a rotation of the vehicle's wheels and such that the electric motor (52) continuously powers the one or more wheels (40).

9 Claims, 3 Drawing Sheets

(51) Int. Cl.
  *A63H 17/26* (2006.01)
  *A63H 17/32* (2006.01)
(52) U.S. Cl.
  CPC ..... *B60L 2240/12* (2013.01); *B60L 2240/429* (2013.01)
(58) Field of Classification Search
  USPC ......... 446/78, 88, 93, 94, 95, 436, 441, 448, 446/457, 462, 470, 484
  See application file for complete search history.

(56) References Cited

U.S. PATENT DOCUMENTS

| | | | | |
|---|---|---|---|---|
| 5,254,917 | A * | 10/1993 | Oda | H02P 7/06 318/446 |
| 5,264,763 | A | 11/1993 | Avitan | |
| 5,484,321 | A * | 1/1996 | Ishimoto | F16H 7/023 446/433 |
| 6,616,500 | B1 * | 9/2003 | Harms | A63H 18/02 446/128 |
| 6,679,750 | B1 * | 1/2004 | Nielsen | A63H 7/00 446/278 |
| 6,902,461 | B1 * | 6/2005 | Munch | A63H 33/042 446/91 |
| 9,162,153 | B1 * | 10/2015 | Mimlitch, III | A63H 17/262 |
| 9,636,602 | B1 * | 5/2017 | Sarno | A63H 17/002 |
| 9,665,179 | B2 * | 5/2017 | Degtyarev | G06F 3/017 |
| 10,035,074 | B1 * | 7/2018 | Mucaro | A63H 17/262 |
| 10,307,685 | B2 * | 6/2019 | Sorensen | A63H 17/262 |
| 2005/0215172 | A1 | 9/2005 | Chen | |
| 2006/0258261 | A1 * | 11/2006 | Tse | A63H 17/40 446/442 |
| 2007/0042673 | A1 | 2/2007 | Ishihara et al. | |
| 2007/0128976 | A1 * | 6/2007 | Accerenzi | B60L 15/20 446/465 |
| 2008/0268747 | A1 * | 10/2008 | Moulton | A63H 30/04 446/484 |
| 2015/0060175 | A1 | 3/2015 | Katayama | |
| 2016/0089982 | A1 | 3/2016 | Ienaga | |
| 2016/0129358 | A1 | 5/2016 | Eversoll et al. | |
| 2017/0189826 | A1 * | 7/2017 | Chin | A63H 33/042 |

FOREIGN PATENT DOCUMENTS

| | | |
|---|---|---|
| JP | S57 100995 U | 6/1982 |
| JP | H08-048281 A | 2/1996 |
| WO | 2004/011115 A1 | 2/2004 |
| WO | 2006/133061 A2 | 12/2006 |
| WO | 2011/021164 A2 | 2/2011 |
| WO | 2011/030255 A1 | 3/2011 |
| WO | 2016/035727 A1 | 3/2016 |

OTHER PUBLICATIONS

International Search Report and Written Opinion issued in corresponding international application No. PCT/EP2017/077726, dated Feb. 16, 2018.

International Preliminary Report on Patentability (includes correspondence and amended pages of specification and claims attached thereto), issued in corresponding international application No. PCT/EP2017/077726, dated Oct. 23, 2018.

Search Report issued in Danish priority application No. PA 2016 70854, dated Mar. 2, 2017.

Written Opinion issued in Danish priority application No. PA 2016 70854, dated Mar. 2, 2017. (English translation is unavailable.).

\* cited by examiner

VEHICLE COMPRISING AN ELECTRIC MOTOR AND A METHOD OF STARTING AN ELECTRIC MOTOR FOR PROPULSION OF A VEHICLE

CROSS-REFERENCE TO RELATED APPLICATIONS

This application is a U.S. National Stage of International Application No. PCT/EP2017/077726, filed on 30 Oct. 2017 and published on 3 May 2018, as WO 2018/078151A1, which claims the benefit of priority to Danish Patent Application No. DK PA 2016 70854, filed on 31 Oct. 2016. The content of each of the above referenced patent applications is incorporated herein by reference in its entirety for any purpose whatsoever.

The present invention relates to a vehicle, wherein the vehicle comprises a body, a first wheel axle and a second wheel axle, whereon one or more wheels is/are mounted, an electric motor and a control unit; and wherein the electric motor is connected to the second wheel axle; and wherein the electric motor is configured for driving the one or more wheels that is/are mounted on the second wheel axle.

BACKGROUND

It is commonly known to provide electrically powered vehicles, such as toy cars and trains. Typically such toy trains comprise an electric motor being actuated by means of an on/off switch.

Another known kind of an electrically powered vehicle is an electrically powered bicycle. Typically, electrically powered bicycles comprise an electric assist motor that is actuated when they are pedalled forward. Typically, a sensor is provided at the crank that detects movements. The sensor emits information to a controller that actuates the motor. When the pedalling is discontinued, or braking is performed, the system switches off again. Moreover, some of the rather sophisticated electrically powered bicycles also have a sensor detecting how hard the rider pedals. Thereby the controller is capable of adapting the assistance provided by the motor to the own power of the user. In general, electrically powered bicycles are mounted with an assist motor that augments the user's own pedalling force; and, as soon as the user does not actuate the sensor that detects movements, the motor stops. An example of this is disclosed in the international patent application WO 2011/021164 A1.

Another example of a vehicle with assist motor is described in patent DE102013224885 describing a pushchair and a method of assisting pushchair wherein an assist motor is capable of supplementing with an assisting force in the same direction as an applied push or pull force. US 2015/0060175 A1 discloses a similar system for a stroller. WO 2011/030255 A1 discloses a motor assisted mobile X-ray system.

Thus, it is known to provide vehicles that comprise an electrically powered assist motor capable of supplementing the manually applied power with an assisting motive force from the electric motor, and wherein the motor's motive force is adapted to the magnitude of the applied motive force.

However, it is desirable to provide an intuitive, simple actuation of an electrical motor for a vehicle whereby also small children can use the electrically powered vehicle.

BRIEF DESCRIPTION OF THE INVENTION

It is consequently the object of the invention to provide a vehicle where the user is enabled to start the electric motor in a simple manner.

This is accomplished as set forth above in that the vehicle comprises a movement detection unit configured for detecting a movement in the form of a rotation of the vehicle's wheels and/or wheel axles; and wherein the control unit is configured for receiving a signal from the movement detection unit when it detects a movement of the vehicle; and wherein the control unit is configured for starting the electric motor when the movement detection unit detects a movement in the form of a rotation of the vehicle's wheels to the effect that the electric motor continuously powers the one or more wheels.

Hereby it is accomplished that the vehicle is configured for the electric motor to be started by a manually applied motive force of the vehicle; and that the electric motor continuously powers the one or more wheels.

Hereby a vehicle is accomplished that is actuated by a manual motive force that starts the vehicle's electric motor following which the vehicle drives on its own.

Such vehicle is easy to start even for small children that do not have the knowledge or motor function skills to actuate a small on/off switch, a manual movement of the vehicle being detectable and capable of initiating onset of the electric motor.

This enables the option, by a simple construction, to be able to actuate the vehicle by a manual motive force and thereby to start the vehicle's electric motor following which the vehicle drives on its own.

An embodiment of the invention relates to the movement detection unit comprising a sensor detecting a current that is induced in the electric motor when wheel/wheel axle are rotated.

A further embodiment of the invention relates to the movement detection unit comprising a movement sensor.

An embodiment of the invention relates to the movement sensor being connected to the first wheel axle whereby the movement sensor is configured for detecting a rotary motion of the first wheel axle.

An embodiment of the invention relates to the movement detection unit being configured for detecting the speed of rotation of the first wheel axle; and that the electric motor is configured for being started at a speed that is adapted to the detected speed of rotation.

An embodiment of the invention relates to the vehicle comprising a second movement sensor that is connected to the second wheel axle; and wherein the second movement sensor is configured for being able to detect a braking or blocking force that is applied to the motor-assisted wheel mounted on the second wheel axle whereby the control unit is capable of stopping the electric motor.

An embodiment of the invention relates to the vehicle comprising at least three wheels distributed with at least one wheel on the first wheel axle and two, wheels on the second wheel axle.

An embodiment of the invention relates to the vehicle comprising at least one wheel comprising toothing.

An embodiment of the invention relates to the one or more wheels that is/are powered by the vehicle's electric motor comprising a coarse, external, conical toothing and a fine toothing on the whole or parts of the periphery of the wheel.

An embodiment of the invention relates to the vehicle being a part of a toy building set comprising toy building elements, wherein the toy building elements comprise complementary coupling means that are preferably arranged in a modular two-dimensional pattern.

Hereby it is accomplished that a toy building set is provided that comprises toy building elements that can be interconnected to form different structures and that thereby increase the play variation options of the toy building set.

According to a further aspect of the invention, a method of starting an electric motor for propulsion of a vehicle is provided, whereby the method comprises the following steps: movement of the one or more wheels of the vehicle by a rotation of the one or more, wheels; detection of the rotary movement; starting of an electric motor when a rotary movement is detected, wherein the electric motor powers the one or more wheels; and propulsion of the vehicle, wherein the vehicle is powered continuously by a driving force applied by the electric motor.

Hereby a method is accomplished whereby an electrically motorized vehicle is easy to start. The starting is intuitive and simple even to small children, and the mere application of a manual motive force starts the vehicle's electric motor, and the vehicle drives on its own. Such method does not presuppose any knowledge or motor function capabilities eg for actuating a small on/off switch.

An embodiment of the invention further relates to the method that the movement is detected by a rotation of the vehicle's first wheel axle, and the vehicle is powered by a driving force from the electric motor applied to the second wheel axle.

An embodiment of the invention further relates to the method that the speed of rotation of the first wheel axle is detected, and the driving force applied from the electric motor onto the second wheel axle is adapted such that the speed of the vehicle is adapted to the magnitude of the detected speed of rotation.

An embodiment of the invention further relates to the method that the driving force from the electric motor is constituted by a continuous constant force whereby the speed of the vehicle is constant.

An embodiment of the invention further relates to the method that the direction of rotation of the movement is detected, and the electric motor supplies a driving force to the vehicle in the same direction of rotation as the detected direction of rotation.

An embodiment of the invention relates to the method that deceleration or blocking of the one or more wheels powered by the electric motor is detected by a second movement sensor being connected to the second wheel axle of the vehicle, following which driving force from the electric motor is disconnected, and the vehicle comes to a halt.

LIST OF FIGURES

An embodiment of the invention will now be explained in further detail with reference to the drawing, wherein FIG. 1 illustrates a vehicle in a perspective view;

DETAILED DESCRIPTION WITH REFERENCE TO THE FIGURES

Figure 1:
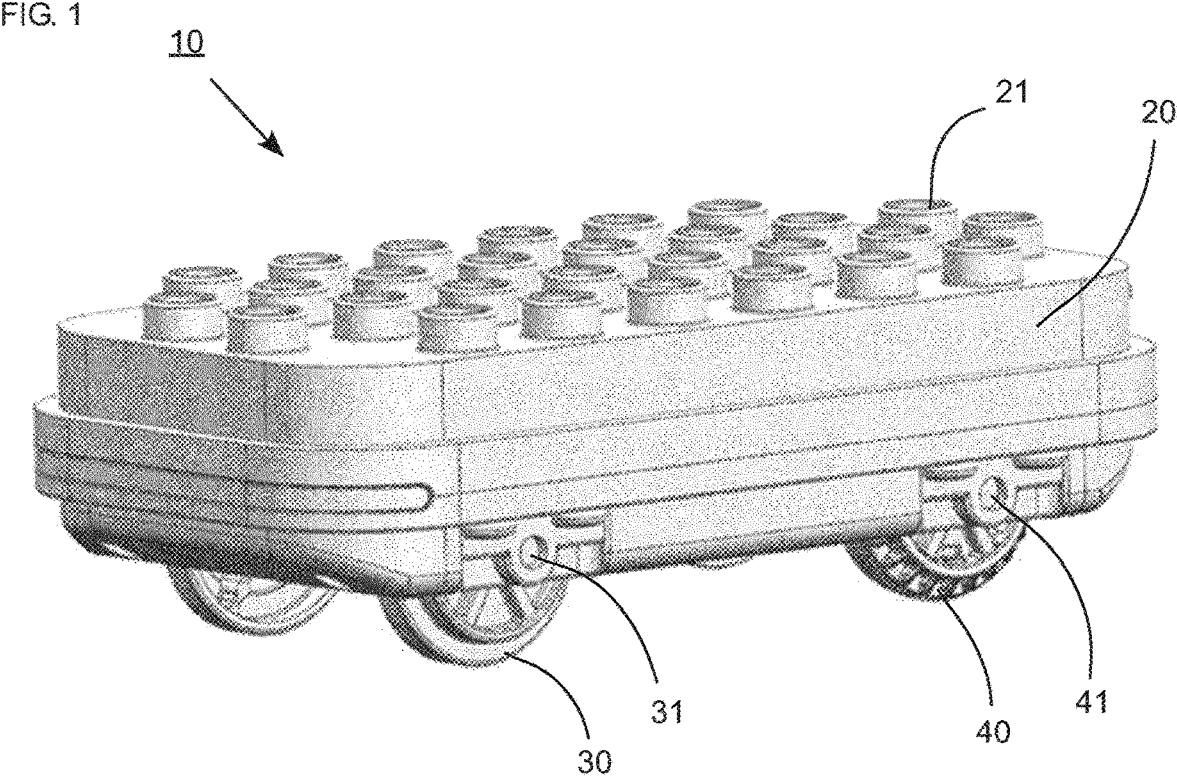

The present invention relates to a vehicle (10) comprising an electric motor (51), and a method of starting the electric motor (51) for propulsion of the vehicle (10).

The vehicle (10) is started in that a manually applied force causes one or more of the vehicle's wheels to rotate. Such rotary movement of the one or more wheels of the vehicle is detected, following which the electric motor (51) is started; and wherein the electric motor powers the one or more wheels (40). The vehicle is powered continuously by a driving force applied by the electric motor.

Detection of a movement of the vehicle can be made in various ways. The detection may be based on the movement detection unit comprising a sensor detecting a current induced in the electric motor (51) when wheel/wheel axle (31, 41) are rotated; or that the movement detection unit is constituted by a movement sensor (53) that detects the rotation. The manual movement of the vehicle can thus be detected and initiate that the electric motor is started.

FIG. 1 illustrates a vehicle (10) comprising a body (20). The vehicle comprises two sets of wheels (30, 40), wherein the first set of wheels (30) is connected to a first wheel axle (31), and a second set of wheels is connected to a second wheel axle (41). Moreover, the vehicle comprises coupling means (21) in the form of coupling studs.

Generally the first wheel axle (31) is a passive wheel axle, and the second wheel axle (41) is an active wheel axle. That means that the first wheel axle (31) and the first set of wheels (30) are without drive means and merely follow the vehicle's (10) movement; and wherein the second wheel axle (41) and the second set of wheels (40) are powered by the electric motor when it is started/actuated.

Figure 2:
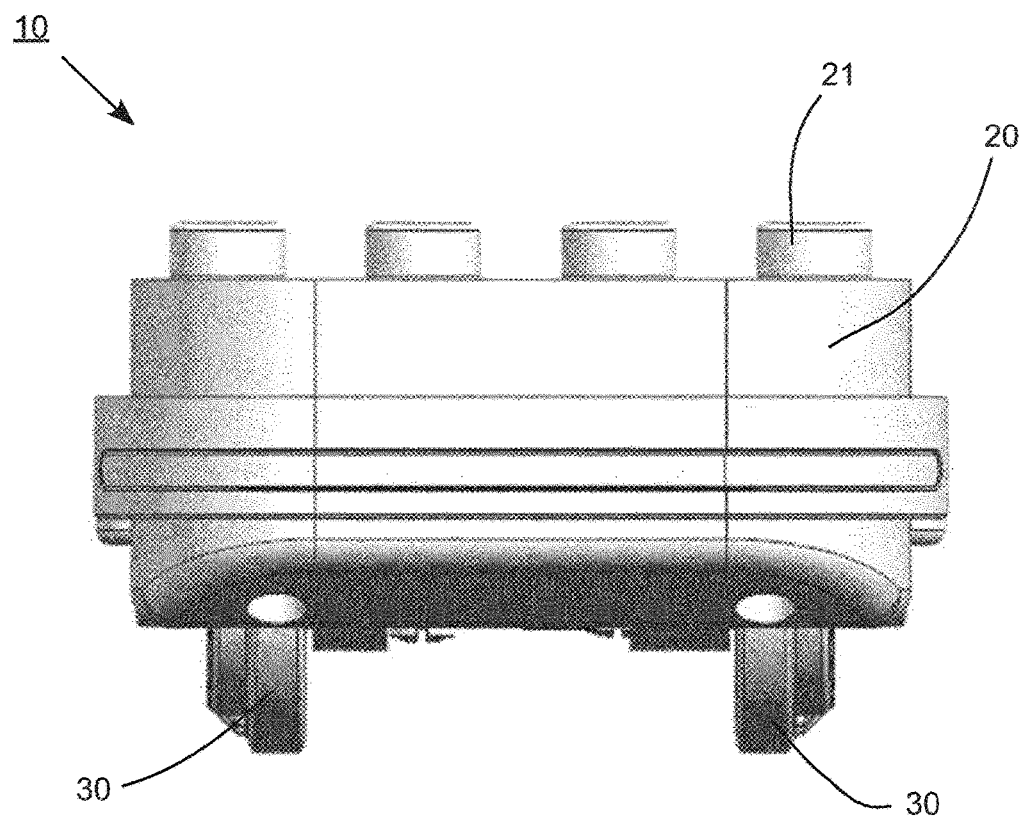
FIG. 2 illustrates a vehicle seen from in front.

FIG. 2 illustrates the vehicle which is also shown in FIG. 1. In the shown embodiment, the fore end of the vehicle will appear. The vehicle comprises a set of wheels with two wheels (30). However, the vehicle may also be configured as eg a three-wheeled vehicle, and in one embodiment the first wheel axle comprises a wheel (30), preferably located centrally on the first wheel axle.

Figure 3:
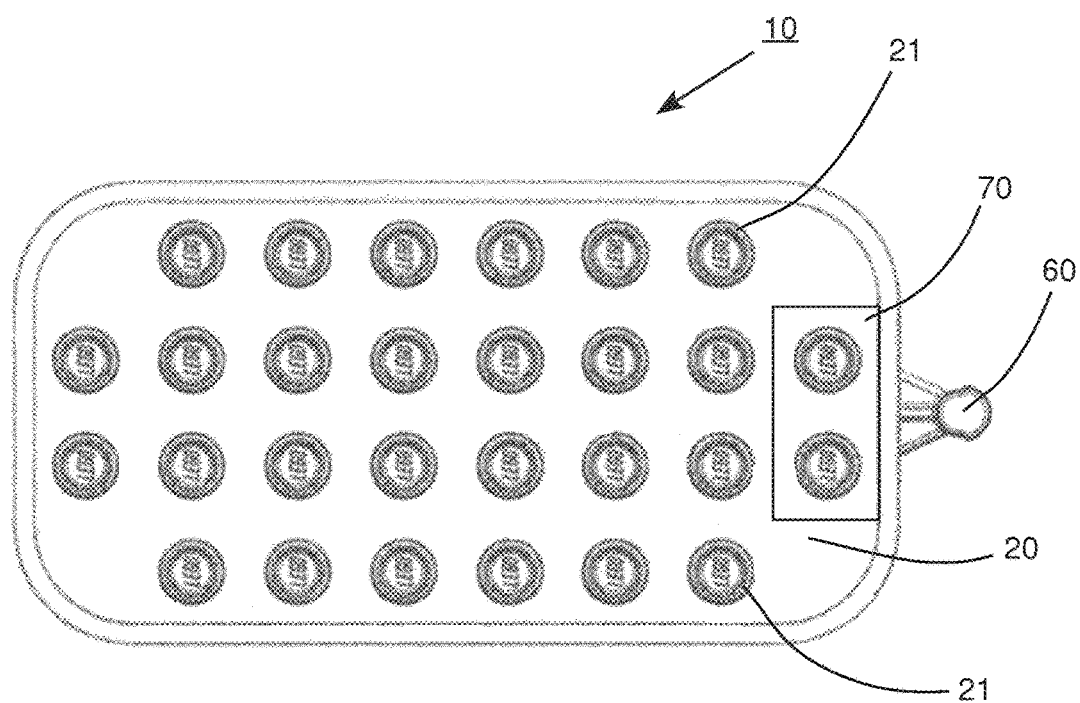
FIG. 3 illustrates a vehicle seen from above, interconnected with a toy building element comprising coupling means.

The vehicle (10) illustrated in FIGS. 1 and 2 is also, illustrated in FIG. 3, but seen from above. The vehicle comprises a number of coupling means (21) located on the upper face of the vehicle's body (20) in a modular two-dimensional pattern, whereby one or more toy building elements with complementary coupling means can be interconnected with the coupling means (21) of the vehicle. In the figure, a toy building element (70) is illustrated when mounted on top of the vehicle's body (20).

The vehicle (10) moreover further comprises a second coupling means (60) in the form of a draw-hook whereby the vehicle is configured for being able to pull one or more connected wagons.

Figure 4:
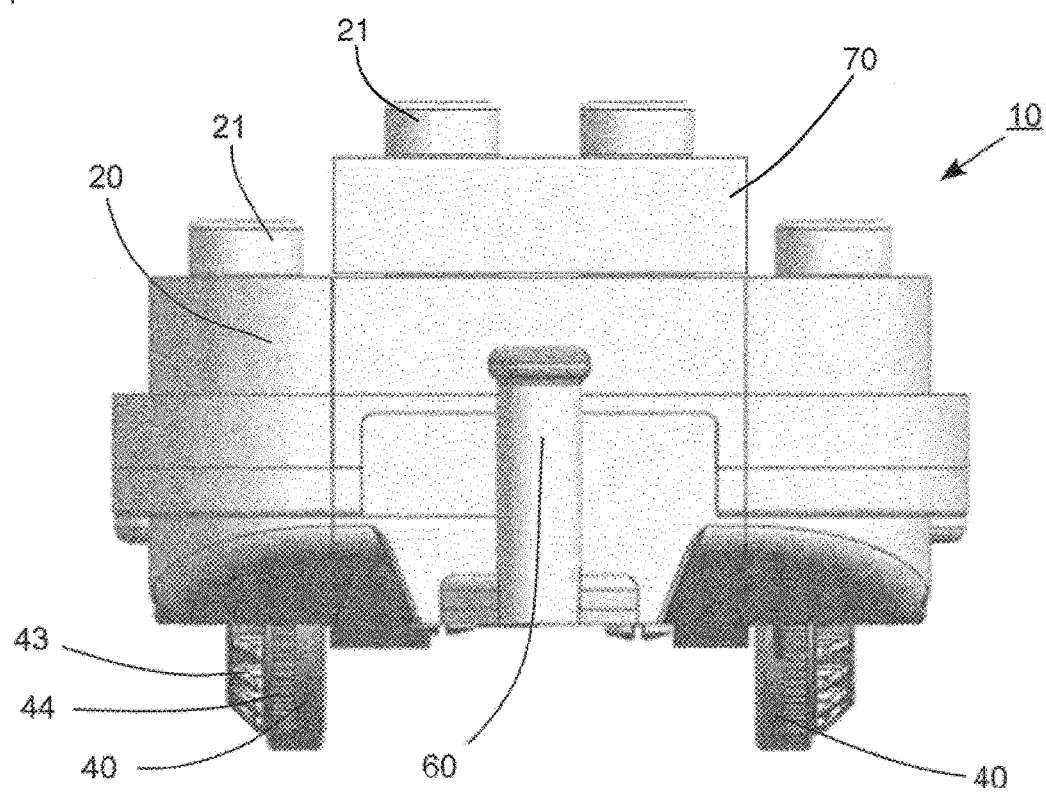
FIG. 4 illustrates a vehicle seen from behind and a toy building element.

FIG. 4 illustrates the vehicle seen from behind (as also illustrated in FIGS. 1-3) where the second coupling means (60) is mounted. A toy building element (70) is located on top of the body (20), where the toy building element (70) is interconnected with two of the vehicle's coupling means (21). Both the vehicle and the toy build element (70) comprise coupling means (21).

The coupling means (21) may be configured s coupling studs and complementary coupling means.

The motor-powered rear wheels (40) of the vehicle comprise a coarse, external, conical toothing (43) and a fine toothing (44) on the whole or parts of the periphery of the wheel (40).

Figure 5:
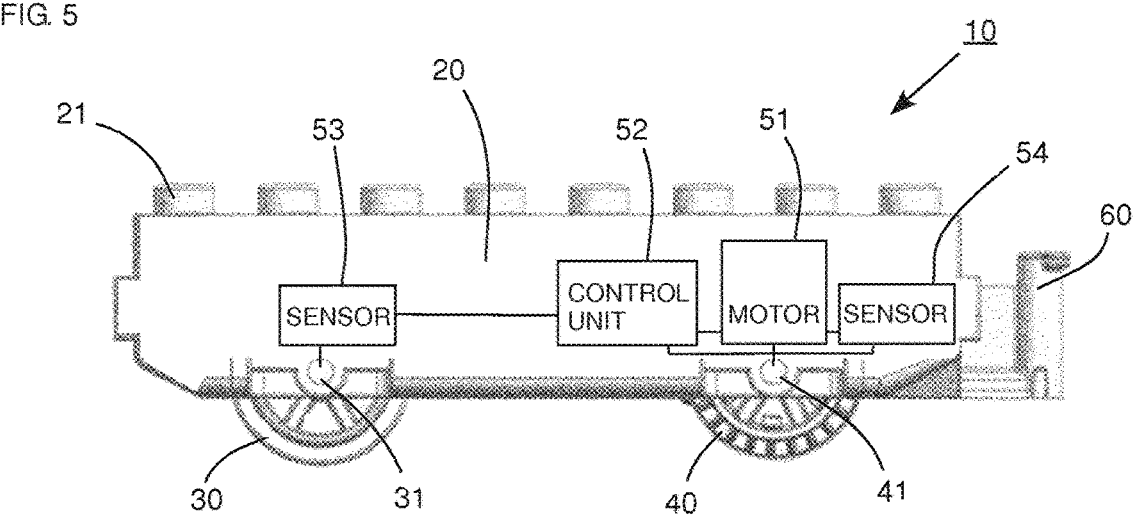
FIG. 5 illustrates the contour of a vehicle seen from the side and a schematic illustration of the electronic control unit.

The vehicle (10) illustrated in FIG. 5 comprises a body (20) comprising coupling means (21) and a second coupling means (60) in the form of a draw-hook whereby the vehicle is configured for being able to pull one or more connected wagons.

Moreover, the vehicle comprises a first wheel axle (31) which is passive and a second wheel axle (41) that can be powered actively by an electric motor (51), and wherein the electric motor is connected to the second wheel axle (41). The construction of the electronic control unit is illustrated located within the vehicle's body (20) and is illustrated schematically in FIG. 5, seen from the side of the vehicle.

The electronic control unit can be configured in various ways to achieve the object of the invention. For instance, the movement detection unit may comprise a sensor detecting a current induced in the electric motor (52) when wheel/wheel axle (31, 41) are rotated.

In FIG. 5, the vehicle is further illustrated comprising a first and a second sensor, wherein the first sensor (53) is connected to the first wheel axle (31), wherein, such sensor is configured for detecting a rotation of the first wheel axle (31), and wherein the second sensor (54) is connected to the second wheel axle (41), wherein the sensor is configured for being able to detect a rotation of the second wheel axle (41) or a braking or blocking of the second wheel axle (41) and wheel (40).

According to the embodiment illustrated in FIG. 5, the vehicle comprises a control unit (52), wherein the control unit is capable of transmitting and receiving signals to and from the motor (51) and the sensors (53, 54).

Thus, the vehicle (10) comprises a movement detection unit being configured for detecting a movement of the vehicle, and wherein the control unit (52) is configured for receiving a signal from the movement detection unit when it detects a movement of the vehicle; and wherein the control unit (52) is configured for emitting a signal to start and launch the electric motor (51) when the movement detection unit detects a movement of the vehicle to the effect that the vehicle is configured for the electric motor (52) to be started by a manually applied motive force of the vehicle.

In general, the vehicle (10) has a movement sensor (53) which is connected to the first wheel axle (31) whereby the movement sensor is configured for detecting a rotary movement of the first wheel axle, and the electric motor (51) is connected to the second wheel axle (41) whereby the electric motor powers the second wheel axle (41) for propulsion of the vehicle (10).

The movement detection unit is configured for detecting the speed of rotation, and the control unit (52) is configured for being able to transmit a signal to the electric motor (51) to the effect that the electric motor is started at a speed which is adapted to the detected speed of rotation.

In the illustrated embodiment of FIG. 5, the vehicle comprises a further movement sensor (54) Such second movement sensor (54) is connected to the second wheel axle (41) like the electric motor (51).

In general, the control unit (52) is connected to the remainder of the units, including the electric motor (51) and the movement sensors (53, 54), and the control unit (52) is configured for being able to detect both movements of the vehicle's wheels and deceleration or blockings of the wheels (30, 40) of the vehicle.

In general, the detection of whether the vehicle has been provided with a manually applied motive force or a manually applied braking or blocking force will occur by detection of a movement in the form of a rotation of a wheel axle. In this embodiment, the wheels (30, 40) are securely mounted to the wheel axles (31, 41).

In a further aspect of the present invention, the method relates to starting the vehicle (10) comprising an electric motor. The method comprises a movement of the vehicle's one or more wheels (40) by a rotation of the one or more wheels, said movement being detected, and the electric motor (51) being started, and the vehicle is powered by a driving force applied by the electrical motor.

According to an embodiment of the method, the method further comprises that the movement is detected by a rotation of the vehicle's first wheel axle (31), and wherein the vehicle is powered by a driving force supplied by the electric motor (51) applied to the second wheel axle (41). Moreover, the movement detection unit is configured for being able to detect both the speed of rotation and the direction of rotation, and the vehicle's speed and travelling direction are adapted to the driving force applied by the electric motor and the direction of rotation of the vehicle, whereby the direction of powered travelling, is the same as the manually applied direction of movement.

The driving force is constituted by a continuous constant force, whereby the vehicle's speed is constant; however, the vehicle and the motor may, in one embodiment, rather be configured such that the speed of the vehicle increases progressively until desired or pre-set maximum speed is reached.

The method further comprises the action that a braking or blocking of the vehicle's motor-powered wheels (40) is detected by the second movement sensor (54) on the second wheel axle (41) of the vehicle, the detection of an oppositely oriented force relative to the force applied by the electric motor, following which driving force from the electric motor is interrupted and the vehicle is stopped.

Figure 6:
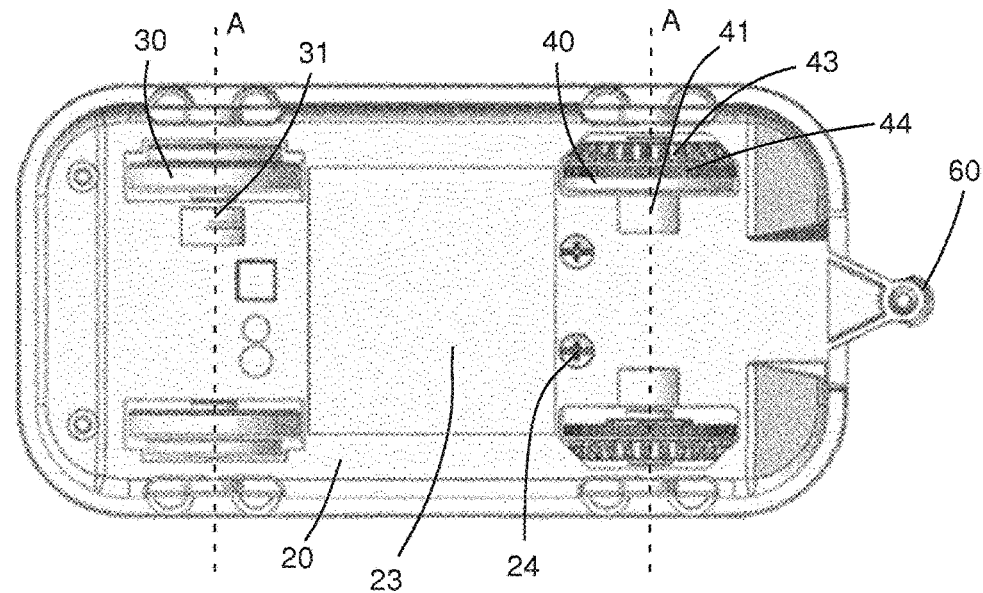
FIG. 6 illustrates a vehicle seen from below.

In FIG. 6, the vehicle (10) as also shown in the previous figures, is shown seen from below.

Here, the first set of wheels (30) is shown which rotate about the first wheel axle (31), which is illustrated by a dotted line A Likewise, the second set, of wheels (40) will appear that rotate about the second wheel axle (41), which is illustrated by a dotted line A.

The bottom of the vehicle's body (20) comprises a cover (23) and attachment means (24) in the form of screws. When screws and cover are dismounted, a user obtains access to a battery chamber for exchange of battery.

The motor-powered rear wheels (40) of the vehicle comprise a coarse, external, conical toothing (43) and a fine toothing (44) on the whole or parts of the periphery of the wheel (40).

Figure 7:
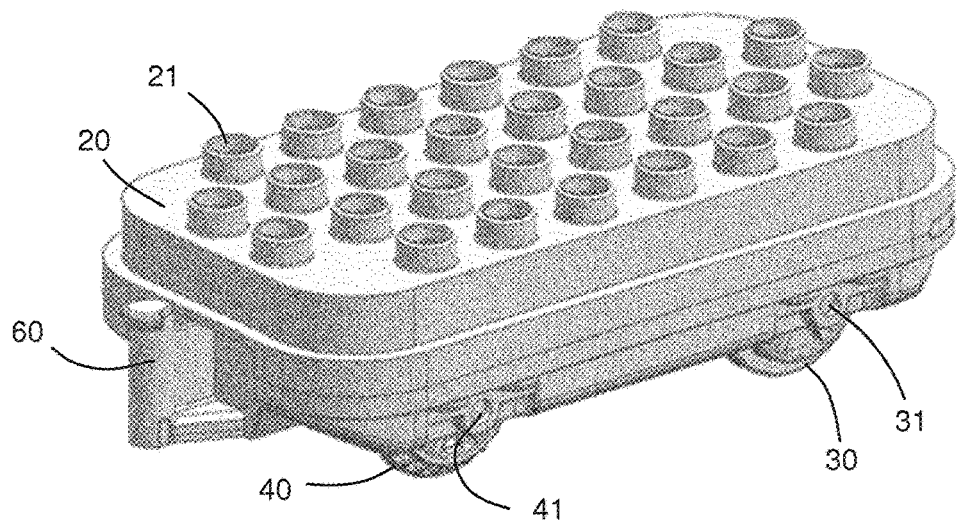
FIG. 7 illustrates a vehicle seen in a perspective view.

FIG. 7 illustrates the vehicle as shown in FIG. 6 in a perspective view. The vehicle (10) comprises a body (20) comprising coupling means (21, 60), respectively, in the form of coupling studs whereby the vehicle can be interconnected with toy building elements, and a coupling means in the form of a draw-hook, whereby the vehicle is configured for being able to pull one or more coupled wagons.

In the figure, the motor-powered rear wheels (40) of the vehicle are mounted on the second wheel axle (41), and the vehicle's passive front wheels (30) are mounted on the first wheel axle (31).

According to one embodiment, the vehicle (10) constitutes a toy building element of a toy building set.

The toy building elements (10, 70) illustrated in FIGS. 3 and 4 comprise complementarily configured coupling means, whereby the toy building elements can be interconnected. The coupling means (21) may be configured as coupling studs and complementary coupling means, whereby the toy building elements can be interconnected to form a structure.

In the specific embodiment as illustrated in FIGS. 3 and 4, the toy building element (70) is located on top of the vehicle (10).

The invention claimed is:

1. A vehicle, wherein the vehicle comprises:
a body, a first wheel axle and a second wheel axle, the first wheel axle and the second wheel axle each having one or more wheels mounted thereon, an electric motor and a control unit;
wherein the electric motor is connected to the second wheel axle;
wherein the electric motor is configured for driving the one or more wheels that are mounted on the second wheel axle;
wherein the vehicle is a part of a toy building set comprising toy building elements, wherein the toy building elements comprise complementary coupling means that are preferably placed in a modular two-dimensional pattern, and wherein the toy building elements can be interconnected to form a structure;
wherein the vehicle comprises a movement detection unit configured for detecting a movement in the form of a rotation of the vehicle's wheels and wheel axles;
wherein the control unit is configured for receiving a signal from the movement detection unit when it detects a movement of the vehicle;
wherein the control unit is configured for starting the electric motor when the movement detection unit detects a movement and a direction in the form of a rotation of the vehicle's wheels to the effect that the electric motor continuously powers the one or more wheels of the second wheel axle; and
wherein the electric motor is configured to continuously power the one or more wheels of the second wheel axle in the same direction as the direction detected by the movement detection unit.

2. The vehicle according to claim 1, wherein the movement detection unit comprises a sensor detecting a current that is induced in the electric motor when wheel/wheel axle are rotated.

3. The vehicle according to claim 1, wherein the movement detection unit comprises a movement sensor.

4. The vehicle-according to claim 3, wherein the movement detection unit is connected to the first wheel axle whereby the movement sensor is configured for detecting a rotary motion of the first wheel axle.

5. The vehicle according to claim 1, wherein the movement detection unit is configured for detecting the speed of rotation of the first wheel axle, and wherein the electric motor is configured for being started at a speed equal to the detected speed of rotation of the first wheel axle.

6. The vehicle according to claim 1, wherein the vehicle comprises a second movement sensor that is connected to the second wheel axle and wherein the second movement sensor is configured for being able to detect a braking or blocking force that is applied to the motor-assisted wheel mounted on the second wheel axle whereby the control unit is capable of stopping the electric motor.

7. The vehicle according to claim 1, wherein the vehicle comprises at least three wheels distributed with at least one wheel on the first wheel axle and two wheels on the second wheel axle.

8. The vehicle according to claim 1, wherein the vehicle comprises at least one wheel comprising toothing.

9. The vehicle according to claim 8, wherein the one or more wheels that are powered by the vehicle's electric motor comprise a coarse, external, conical toothing and a fine toothing on the whole or parts of the periphery of the wheel.

* * * * *